United States Patent [19]
Chan

[11] Patent Number: 5,825,015
[45] Date of Patent: Oct. 20, 1998

[54] MACHINE READABLE BINARY CODES

[75] Inventor: John Paul Chan, Beverley, United Kingdom

[73] Assignee: Electronic Automation Limited, Hull, United Kingdom

[21] Appl. No.: 722,083

[22] PCT Filed: Apr. 25, 1995

[86] PCT No.: PCT/GB95/00936

§ 371 Date: Oct. 18, 1996

§ 102(e) Date: Oct. 18, 1996

[87] PCT Pub. No.: WO95/30206

PCT Pub. Date: Nov. 9, 1995

[30] Foreign Application Priority Data

Apr. 29, 1994 [GB] United Kingdom .................... 9408626

[51] Int. Cl.$^6$ ................................................. G06K 19/06
[52] U.S. Cl. ........................................... 235/494; 235/454
[58] Field of Search ....................................... 235/494, 454

[56] References Cited

U.S. PATENT DOCUMENTS 4,924,078  5/1990  Sant' Anselmo et al. .
5,128,526  7/1992  Yoshida ................................... 235/494
5,288,986  2/1994  Pine et al. .

FOREIGN PATENT DOCUMENTS

WO 92/18947  10/1992  WIPO .

*Primary Examiner*—Harold Pitts
*Attorney, Agent, or Firm*—Burns, Doane, Swecker & Mathis, L.L.P.

[57] ABSTRACT

A machine readable binary code includes a two-dimensional matrix of data cells (6) having a plurality of sides. A unique sub-array of data cells (1, 2, 3, 4) is positioned at the point of intersection of each pair of adjacent sides to define and uniquely identify each corner of the matrix.

9 Claims, 7 Drawing Sheets

MACHINE READABLE BINARY CODES

The present invention relates to binary codes which are optically readable by a machine and which can be used on items to identify them. More specifically, the present invention relates to a machine readable binary code consisting of a two-dimensional matrix or array of data cells.

It is well known to use bar codes to identify a wide variety of articles and products. Bar codes consist of a number of bars of various widths arranged side by side in a linear orientation. To determine the meaning of a bar code, the bar code must be scanned in a direction substantially parallel with the linear orientation of the bars. It follows that bar codes have a preferred scanning direction and the scanning machine device used to read them must be able to scan in this direction. Because the bar codes must be properly oriented for scanning, they must be pre-oriented for presentation to the scanning machine or the scanning machine must be capable of scanning in many different directions.

Bar codes enjoy use in a wide range of applications. However, they are not generally considered suitable in those applications where space is limited because it is not possible to reliably bar code large amounts of information in a small space available.

These limitations have led to the development of two-dimensional codes for the encryption and coding of data.

There are two basic types of known two-dimensional codes. One of these is based on traditional bar code technology in that it comprises rows of bar codes arranged one on top of another, with or without additional lines to separate the rows. The most well known examples of this type of code are referred to by the names Code 49, Code 16K, CODABLOCK and PDF 417. These codes do not represent a major change from bar code technology as both the printing and reading equipment are either the same or very similar. They also inherit some of the limitations associated with bar codes. For example, both Code 49 and Code 16K have a fixed row length and are limited in the number of rows. Consequently, the amount of data which can be encoded is limited given the actual physical size of the code. Furthermore, as with bar codes, this type of code can only be read in a fixed orientation.

The other type is matrix codes of which the more well known are Data Matrix, USD-5 and Vericode. These codes are generally readable only with cameras and image recognition systems.

The data carrying capacity of matrix codes varies from one type to another. Data Matrix from International Data Matrix (U.S.A.) can encode up to 500 ASCII or ISO characters. Vericode developed and patented by Veritec (U.S.A.) can be printed in several formats, one of which can encode up to 2000 characters. USD-5, from Baumer Ident (Sweden) is a lower density code which can encode up to 64 decimal digits; and although this code can be read in any orientation its matrix density is fixed and hence flexibility is limited.

Both datacode and vericode take the form of a square matrix of binary data cells with a solid border which contains code orientation and timing (i.e. density) information. Both codes can dynamically change their density and size without re-configuration of the system. However, both codes are considered unsuitable for applications such as the leather and textile industry where it is a requirement that the data cells comprising the code take the form of holes punched in the article or product to be coded. Both codes require solid borders to provide code orientation and timing information consequently they are liable to 'fall out' or at best be subject to high risk of tearing and code damage when used in leather and textile applications.

Moreover, both datacode and vericode are also very intolerant of misalignments of the data cells and can only cope with minimal stretching and distortion. Essentially to be readable the code matrix must retain the form of a paralellogram. There are many applications where the codes become distorted in use and hence it is not possible to meet this requirement.

A review of these known two-dimensional codes has concluded that there are drawbacks and limitations with all of them in the following areas:

1) robustness (consistent identification of the current code).
2) processing speed in terms of realistic throughputs for on-line applications.
3) consistent readability with low-cost inkjet printed codes.
4) the use of holes instead of ink printing to represent data cells.
5) consistent reading of distorted codes.

No one known two-dimensional code has been able to meet all of these requirements.

WO-A-9 218 947 discloses an identification or data tag composed of a central set of data cells surrounded by border cells which cooperate with their adjacent data cells by contrasting therewith to form a reference perimeter defined by the intersections of the boundaries of the border cells with their respective adjoining data cells.

U.S. Pat. No. 4,924,078 discloses a symbol comprising a square array of data cells surrounded by a border of "on" cells. The border can be surrounded by an external data field in which orientation cells can be located.

SUMMARY OF INVENTION

It is an object of the present invention to provide a machine readable binary code which enables each of the corners of a symbol embodying the code to be identified by a code reading machine and further, which enables each of the corners to be distinguished one from another.

It is an object of the present invention to provide a machine readable binary code which does not require the presence of solid borders to provide orientation and timing information for a reading machine.

It is a further object of the present invention to provide a machine readable binary code which enables symbol location, orientation and distortion to be calculated with ease. In this way the readability of the code is not diminished by stretching and distortion of the symbol.

According to the present invention there is provided a machine readable binary code comprising a two dimensional matrix of data cells, said matrix having a plurality of sides, said binary code being arranged so that: a sub-array of data cells is provided in the region of the point of intersection of each pair of adjacent sides; each of which sub-arrays comprises a first group of data cells and a second group of data cells; the configuration of which first group of data cells is the same for each sub-array; each of which first groups of data cells comprises a distinctive pattern of "on" data cells which is recognizable by a reading device as denoting the presence of a corner; the configuration of which second group of data cells is different for each sub-array; each of which second groups of data cells is located between the corresponding said first group and the rest of the matrix and is recognizable by a reading device as uniquely identifying each corner of the matrix from the other corners.

Typically the matrix will be four sided and take the form of a square or rectangle. However, it is envisaged that the invention may also be applied to matrices with any polygonal shape, such as a triangle, octagon or parallelogram depending on the specific requirements.

In one embodiment of the invention, each sub-array is defined by a triangle of "on" cells actual corner of the matrix and a combination of "on" and "off" cells formed by two data cells in the sub-array which uniquely identify each corner from the other three. An "on" cell is a positively readable cell such as a dot printed on the article or product to be marked or a hole punched in the surface thereof.

In another embodiment of the invention each sub-array comprises a group of four data cells, two of which are always "on" and serve to define a corner of the matrix and two of which serve to uniquely identify that corner from the other three. Preferably, of the two "on" data cells which serve to define each corner of the matrix one lies at the point of intersection of each pair of adjacent sides of the matrix and the other lies adjacent to the first and outside the said point of intersection.

The arrangement of the two data cells from each sub-array to uniquely identify each corner from the other three is as follows:

Principal corner—1st data cell "on", 2nd "on"
Second corner—1st data cell "on", 2nd "off"
Third corner—1st data cell "off", 2nd "on"
Fourth corner—1st data cell "off", 2nd "off"

Both embodiments of the invention provide a useful alternative to the known matrix codes described above. The former enables the reading machine to tolerate a higher degree of clutter and damage in the symbol, but it does require significantly more processing time than the latter.

As it is possible to uniquely identify each of the four corners of the symbol in which the two-dimensional, machine readable binary code is embodied, it is relatively easy to determine the angle of orientation of the symbol relative to the reading machine.

As well as being able to uniquely identify each of the four corners of the symbol by the number of "on" and "off" data cells present in each sub-array, it is also possible to identify each of the four corners from the relative orientation of each sub-array. The significance of this is that if an "on" data cell is absent or cannot be found due to distortion it is still possible to determine which corner is which.

The density of the matrix, that is to say the number of data cells, can readily be determined by counting the number of data cells in the leading diagonal extending from the principal or reference corner to the opposite corner of the array. In order to ensure accuracy of reading the data cells in the leading diagonal are all "on".

The two-dimensional machine readable binary code in accordance with the invention can be imprinted on an article or product using a variety of techniques, including etching, ink-printing or punching. Importantly, because no border line is required around the internal data field to facilitate orientation and/or timing, the symbol can be punched in an article or product without any risk that this will cause the symbol to fall out or at best tear and cause damage to the code.

BRIEF DESCRIPTION OF THE DRAWINGS

An embodiment of the present invention will now be described, by way of example, with reference to the accompanying drawings, in which.

DETAILED DESCRIPTION

Figure 1:
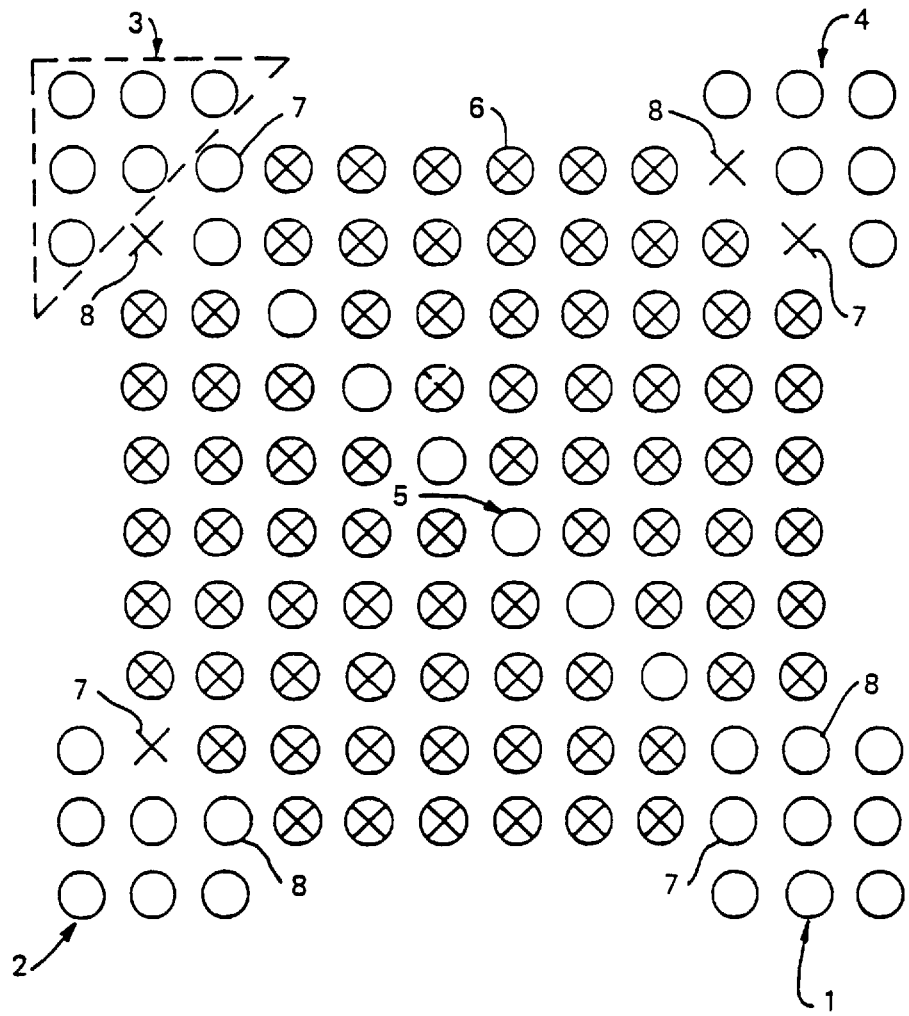
FIG. 1 shows a two-dimensional, machine readable, binary code in accordance with a first embodiment of the invention.

Referring to FIG. 1 of the drawings there is shown a two-dimensional, machine readable binary code which takes the form of a square array or matrix of data cells 6. Each data cell is defined by the presence or absence of a dot—a dot signifies an "on" data cell and the absence of a dot signifies an "off" data cell. Four groups of data cells 1, 2, 3 and 4 at each of the four extremities of the matrix represent the corners. Each group comprises at least six dots (outlined in dotted line) arranged in a triangular manner.

Figure 2:
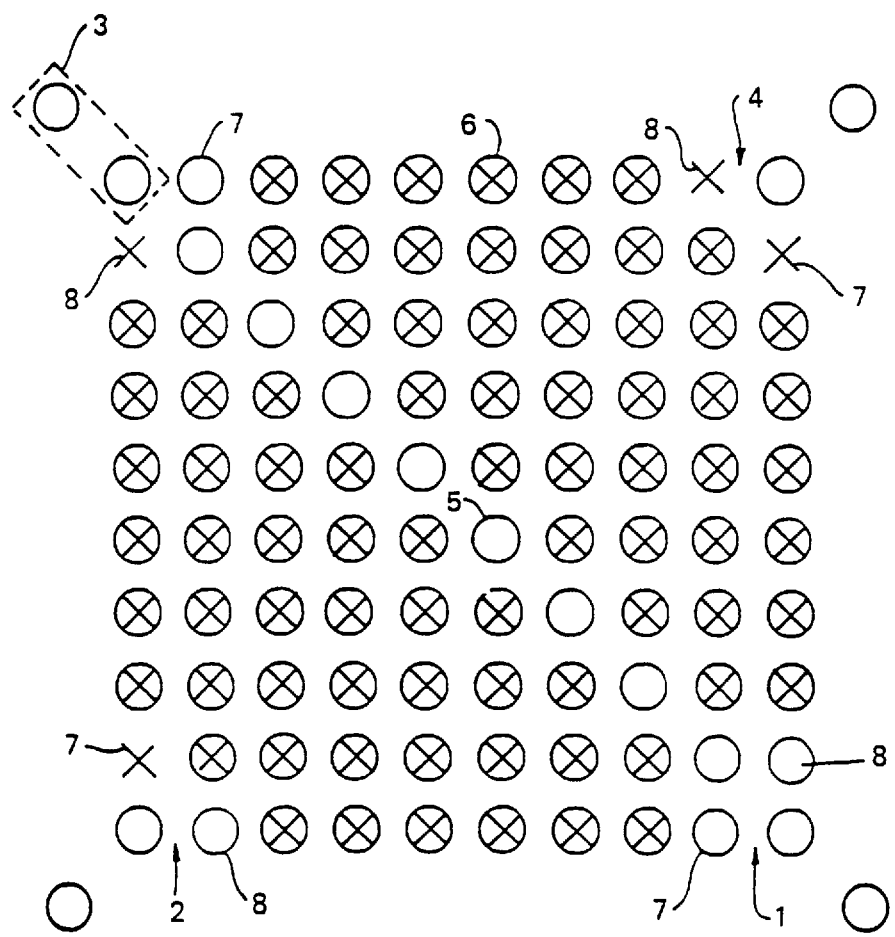
FIG. 2 shows a two-dimensional, machine readable, binary code in accordance with a second embodiment of the invention.

FIG. 2 shows an alternative to the embodiment of FIG. 1 in which each of the four corners of the matrix are distinguished by means of a group of two "on" data cells 1, 2, 3 and 4 (as outlined in dotted lines). As shown, one of each pair of "on" data cells lies at the point of intersection of each pair of adjacent sides of the matrix and the other lies outside the point of intersection on a diagonal line drawn between opposite corners of the matrix.

From a practical point of view the number and configuration of "on" data cells which define each corner of the matrix need not follow either of the two embodiments of FIGS. 1 and 2. However, these are both reliable and easily implemented. The first embodiment with its greater number of "on" data cells enables the code reader to tolerate a higher degree of clutter and damage, but does require significantly more processing than the second embodiment.

In both of the embodiments of FIGS. 1 and 2 each of the four corners of the matrix is uniquely identified from the other three by two data cells 7, 8 in each of the four corners of the matrix. These four pairs of data cells 7, 8 are configured as follows:

Principal corner—1st data cell "on", 2nd "on"
Second corner—1st data cell "on", 2nd "off"
Third corner—1st data cell "off", 2nd "on"
Fourth corner—1st data cell "off", 2nd "off"

This allows each of the four corners to be distinguished one from another.

The leading diagonal 5 connecting the principal corner 1 and the third corner, contains "on" data cells indicating the density of the code. Provisions are made to allow recovery from limited damage to the location, orientation and density information.

| Matrix size | Amount of data storage |
| --- | --- |
| 8 × 8 | 20 bits |
| 9 × 9 | 32 bits |
| 10 × 10 | 46 bits |
| 12 × 12 | 80 bits |
| 14 × 14 | 122 bits |
| 16 × 16 | 172 bits |
| 24 × 24 | 452 bits |
| 32 × 32 | 860 bits |

The data bits are read by dividing the symbol into "cells" using the four corners 1, 2, 3, 4 found and the density information in the diagonal 5. This allows the matrix to be successfully decoded despite stretching and distortion.

The data cell spacing is typically between half and one data cell diameter, but variations of this are possible. A quiet area (without any clutter) surrounds the code and is typically about one quarter of the matrix size, but it may be varied.

The code is located by "probes" provided in the operating software of a scanning device used to read the code. These probes extend parallel to the edges of the image picked up by the scanning device and search inwards to find the corners. The corner data cells are arranged so that a line of any angle, moving across the group will always intersect at least two data cells, even if any two of the six data cells defining a corner are missing.

A probe starts from the top left corner of the image (or region of interest) and scans horizontally inwards until it finds the top corner of the code matrix. Another probe starting from the bottom right corner then finds the bottom corner of the code matrix. Two side probes then scan inwards in the vertical direction. To save processing, they are limited to searching between the top and bottom corner Y co-ordinates defined already by the top and bottom probes.

Figure 3:
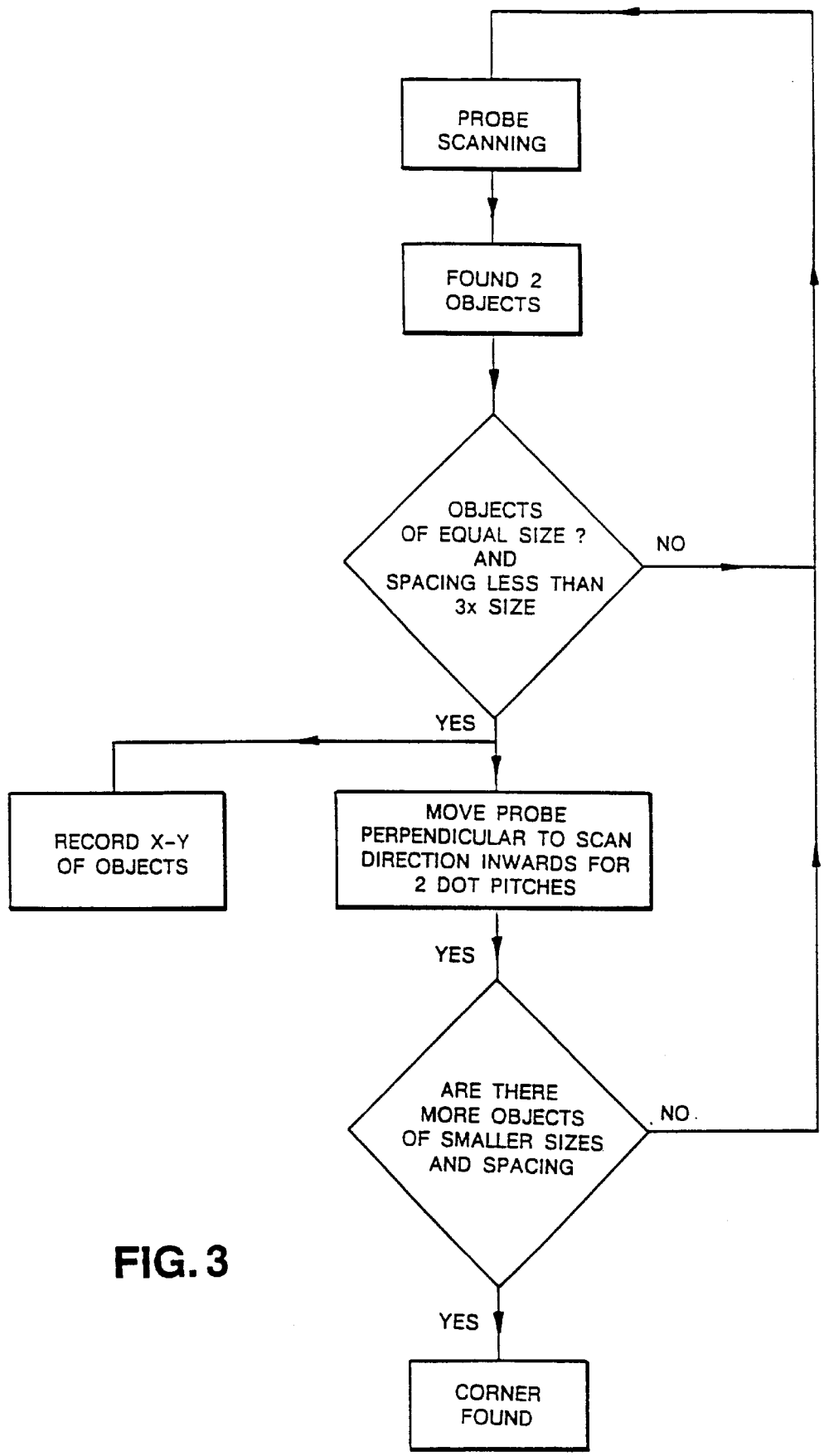
FIG. 3 is a flow chart of typical processing performed to locate a corner within the machine readable, binary code shown in FIG. 1.

The processing of each corner location for the embodiment of the invention as shown in FIG. 1 is given in the flow charts shown in FIG. 3.

Figure 4:
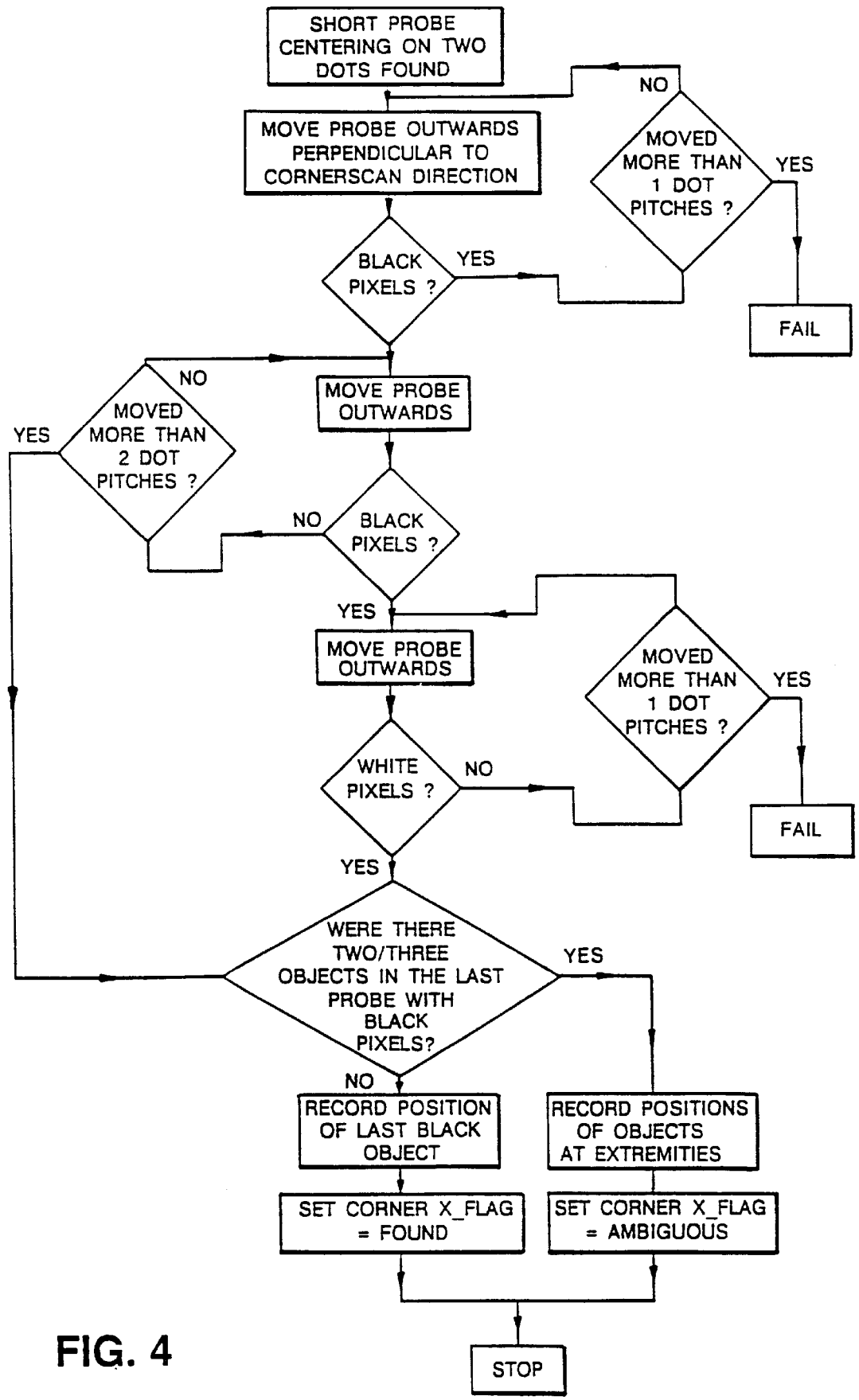
FIG. 4 is a flow chart of typical processing performed to determine the outermost corner dot within the machine readable, binary code shown in FIG. 1.

The flow chart shown in FIG. 4 determines the position of the outermost data cell in the corner 11 and shows that it may be possible for a probe to return two data cell positions as the corner. This can happen if the matrix side is parallel to the probe or if a corner data cell is missing. Once all the corners have been located, it is possible to determine the outermost data cell for each corner.

Figure 8:
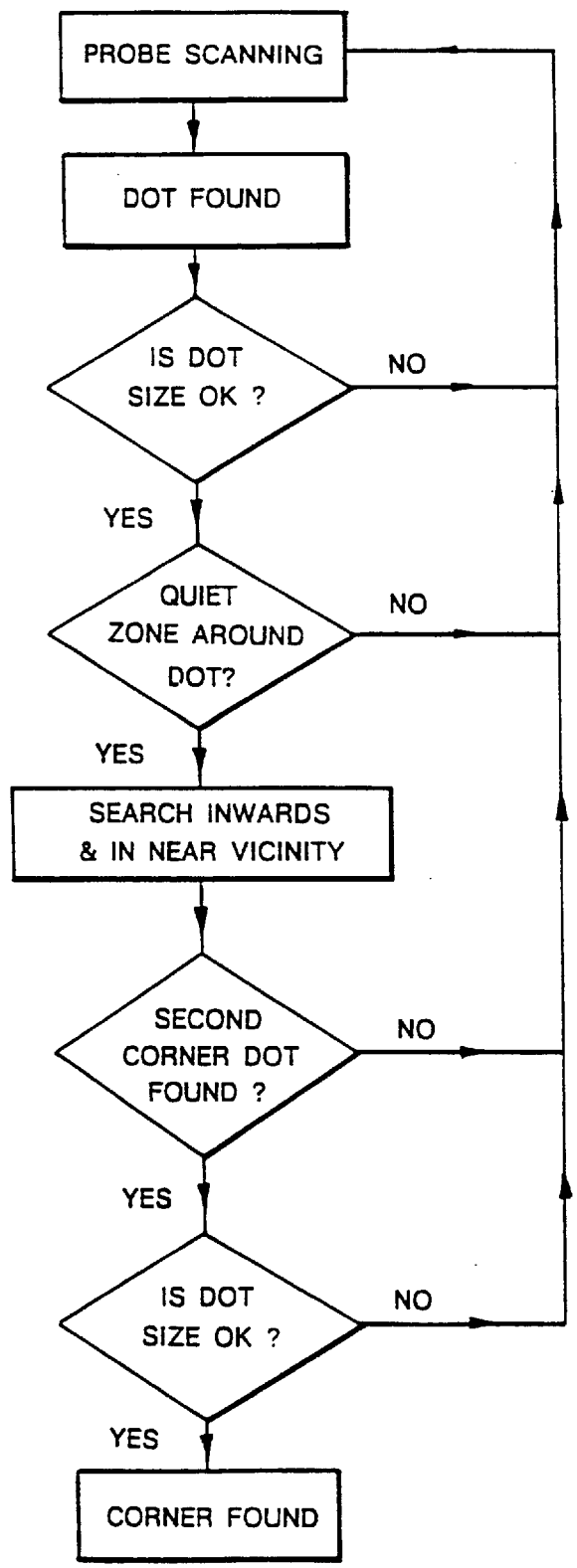
FIG. 8 is a flow chart of the processing performed to locate a corner within the machine readable, binary code shown in FIG. 2.

The processing of each corner location for the embodiment shown in FIG. 2 is given in the flow chart of FIG. 8.

Figure 5:
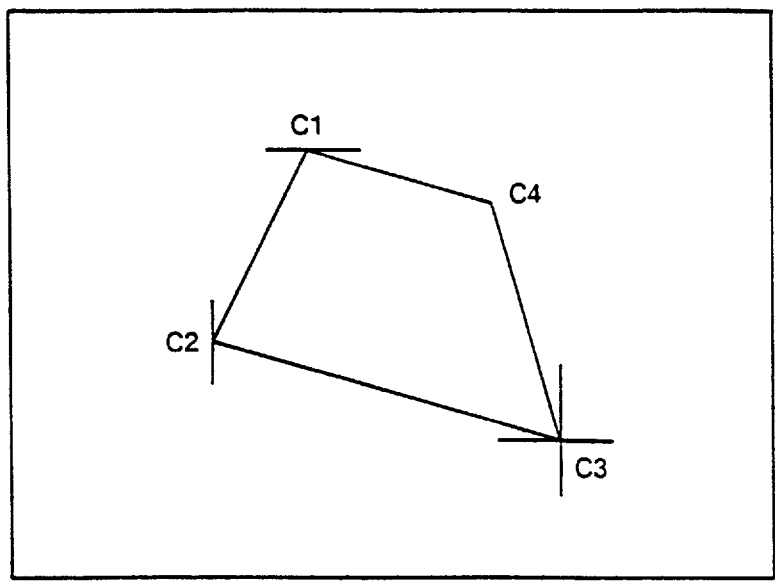
FIG. 5 is a schematic view of a machine readable, binary code in accordance with the present invention in which one corner is not located.

If the code is badly distorted or stretched, it is possible that one or two of the corners may not be located. FIG. 5 shows a code matrix where one of the corners, C4, is not located. It is characterised by the fact that the corner C3 was found by both the bottom probe and the righthand side probe.

The "missing" corner is found by a scanning probe whose limits are defined by the positions of two known corners. Starting from a point formed by orthogonal lines intersecting the two known corners, the probe scans in the direction of the third known corner until the probe limits are reached. If no corner is found, the process is repeated using different corners to define the probe length, position and scan direction.

Figure 6:
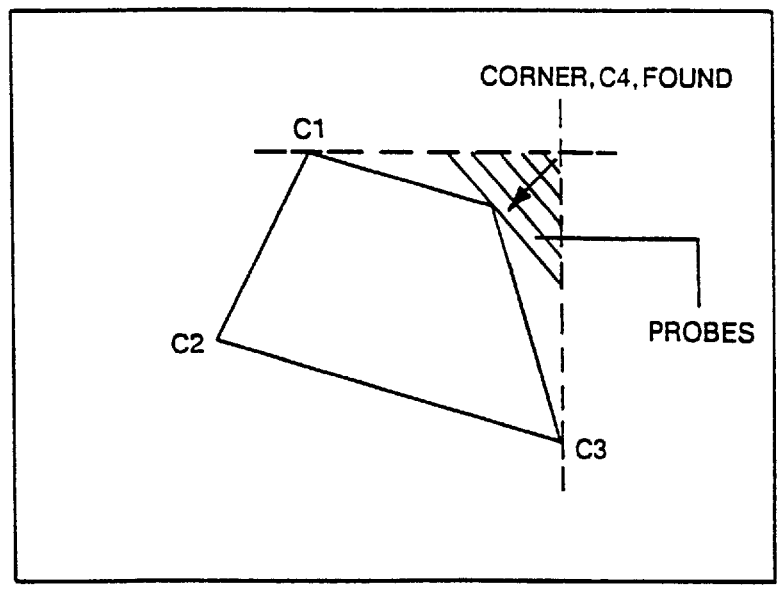
FIG. 6 is a schematic view of the machine readable, binary code of FIG. 5 illustrating how the position of the missing corner is located.
Figure 7:
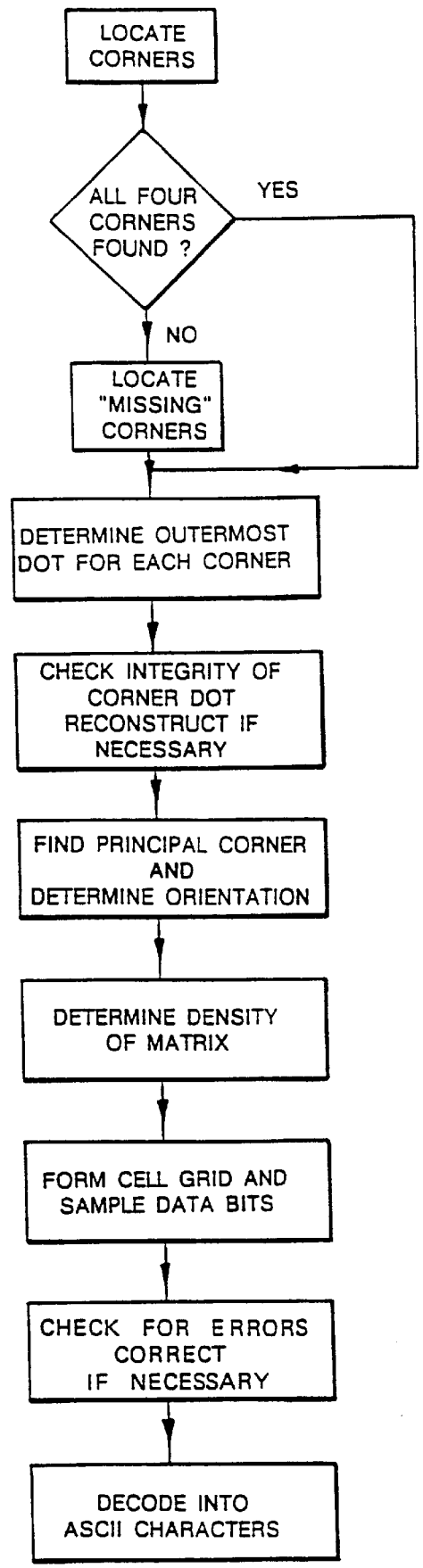
FIG. 7 is a flow chart of the processing performed to decode a machine readable, binary code in accordance with the present invention.

In the example given in FIGS. 5 and 6, a probe starts from a point whose coordinates are given by the vertical position of C1 and horizontal position of C3, and opposite to a third corner, C2. It continues scanning inwards until either a data cell is found or until the limits of the probe are equal to the positions of C1 and C3. In this example, the "missing" corner, C4 is located by the probe. The probe remains parallel to the C1–C3 diagonal and its limits never exceeds the X position of C1 and the Y position of C3.

If the probe started searching from a point formed from orthogonal lines intersecting C2 and C3 and opposite to C1, the probe limits (C2 and C3) would be reached before a data cell is found. This indicates that the missing corner does not lie between C2 and C3.

This process may be used in a similar manner for locating two missing corners. In this case however, the two known corners are assumed to be opposite to each other. The probe will search in both directions on either side of the known diagonal until the missing corners are found.

The data cells in each corner are checked to see if the corner data cell is present. If not, it can be reconstructed using information from the other data cells in the corner group.

Where multiple data cells are used to represent each corner as in the embodiment of FIG. 1, pattern matching techniques are used to identify a corner. Such methods allow a corner to be identified despite data cells being absent. In codes where the corners are represented by a pair of data cells, as in the embodiment of FIG. 2, a damaged or absent corner can be reconstructed if the system is instructed to look for a code of a parallelogram nature.

Once all of the corner data cells are determined the principal or reference corner can be identified. A probe scans along the leading diagonals from the corners. Each corner has a unique sequence of data cells. The principal corner is determined by analysis of the presence and absence of data cells at specified locations. It is possible for one corner to be damaged and still determine the code orientation.

The density of the matrix is determined by counting the number of data cells in the leading diagonal, starting from the principal corner. Only objects greater than a certain size with consistent spacing either side of it, will be considered valid. If a space is found which is approximately twice the average of the previous and next spacing, a data cell is assumed to be missing and will be included in object count.

Using the corner data cells locations and density information, a grid is formed which divides the matrix into "cells". Each cell is sampled to see if there are more than a certain number (as a proportion of the cell size) of dot-coloured pixels. If there are, a data cell is assumed to be present.

The code may be represented by a non-square matrix of data cells, forming a rectangular shape of X data cells wide by Y data cells high. In this case, the user specifies the number of data cells in the horizontal and vertical direction of the code matrix. The reading device can then divide the matrix into cells and decode it as it would a square matrix.

It should be possible for the data to include error checking and error correction codes. These enable the system to confirm the integrity of the code and allow recovery of lost data if necessary. The degree of error correction can be specified to increase or decrease the ability to read damaged or partly missing codes. For a given size matrix, the amount of actual data encoded decreases as the error correction capabilities increases.

The data in a code can be stored in one of many standard formats such as pure binary, numeric, alphabets, alphanumerics, punctuations etc. The use of formats allows the choice between efficient use of the available data bits and the range of characters that can be encoded.

User defined private formats can be set up to provide secure codes and prevent unauthorised reading of the encoded data. Private formats are defined as a sequence of standard formats and can be extremely efficient in minimising the size of the code matrix. An example is given below:

Data to be encoded: "EAL:(0482)-879641"

If a standard format is to be used, a data field of 106 bits is required (18 6-bit alphanumeric characters).

Using a private format, a "key" is defined as a sequence of standard formats. This key tells the system which format each character in the string is encoded. In the above example, the key is defined as 2224241111144111111, meaning the first three characters are format 2, followed by format 4, etc, finally the last character is format 1. The data now requires only 76 bits. Furthermore, the information cannot be fully decoded without the correct key.

Provisions are made so that certain variations of the code can also be read:

1. Mirrored image of code
2. Light dots on dark background as well as dark on light.

To improve the processing speed of the system, various options may be specified by the user e.g.:

1. Assume no clutter around code. A probe will then only look for an intersection of any size to appear. This determines a corner position.
2. Set a region of interest (processing window), so that the search is only carried out within this area.
3. Assume the code to be a parallelogram, so that if one corner is not found, a cell sampling grid can still be formed without having to find the "missing" corner.
4. Allow no more than one dot to be missing from the corner group. This limits the analysis of corner integrity to a smaller set of variations.
5. The orientation of the code is known. No processing is required to determine the relative position of the principal corner.
6. The density of the matrix is known. The leading diagonal does not need to be sampled for the number of dots along its length.
7. Only the centre pixel of each cell is sampled to determine whether or not a dot is present.

What is claimed is:

1. A machine readable binary code comprising a two dimensional matrix of data cells, said matrix having a plurality of sides, said binary code being arranged so that:

a sub-array of data cells is provided in the region of the point of intersection of each pair of adjacent sides;

each of which sub-arrays comprises a first group of data cells and a second group of data cells;

the configuration of which first group of data cells is the same for each sub-array;

each of which first groups of data cells comprises a distinctive pattern of "on" data cells which is recognisable by a reading device as denoting the presence of a corner;

the configuration of which second group of data cells is different for each sub-array;

each of which second groups of data cells is located between the corresponding said first group and the rest of the matrix and is recognizable by a reading device as uniquely identifying each corner of the matrix from the other corners.

2. A binary code reading apparatus for use with a machine readable binary code according to claim 1, the apparatus comprising:

image capture means; and means for processing the captured image, to detect each corner of the machine readable binary code by detecting the first group of data cells of each sub-array, and to distinguish each corner from the other by scanning for the second group of data cells at specified locations.

3. A machine readable binary code according to claim 1, characterised in that at least one data cell from each of the said first groups lies outside the point of intersection of the two sides of the matrix closest to it.

4. A machine readable binary code according to claim 1 characterised in that the matrix is four sided and takes the form of a square or rectangle.

5. A machine readable binary code according to claim 4 characterised in that each of the first groups consists of a triangle of "on" cells, and each of the second group consists of two data cells, which are "on" and "off" in different combinations to uniquely identify each of the four corners from the other three.

6. A machine readable binary code according to claim 4 characterised in that each of the first groups consists of two data cells which are "on" and each of the second groups consists of two data cells which are "on" and "off" in different combinations to uniquely identify each of the four corners from the other three.

7. A machine readable binary code according to claim 5 characterised in that the two data cells from each of the said second groups uniquely identify each of the four corners from the other three as follows:

Principle corner—1st data cell "on", 2nd "on"

Second corner—1st data cell "on", 2nd "off"

Third corner—1st data cell "off", 2nd "on"

Fourth corner—1st data cell "off", 2nd "off".

8. A machine readable binary code according to claim 4, wherein the density of the matrix is determined by counting the number of data cells in the leading diagonal extending from a principal or reference corner to the opposite corner of the array and all the data cells in the leading diagonal are "on".

9. A method of detecting and identifying the corners of a machine readable code according to claim 1 in which the code is optically scanned and a pattern matching technique is used to detect the first group of data cells of each sub-array and, having detected a sub-array by the presence of a first group, the identity of that sub-array is determined by scanning for the said second group of data cells at specified locations.

* * * * *